(12) United States Patent
Choo et al.

(10) Patent No.: US 6,216,097 B1
(45) Date of Patent: Apr. 10, 2001

(54) POWER MEASURING COOLING PLANT SYSTEM AND METHOD

(75) Inventors: Robert R. Choo; David G. Cornog, both of Los Angeles, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/119,490

(22) Filed: Jul. 20, 1998

(51) Int. Cl.[7] .............................. G06F 9/455; G06F 17/50
(52) U.S. Cl. .................................... 703/2; 703/1; 165/48.1
(58) Field of Search .......................... 703/1, 2; 165/48.1, 165/47, 48.2; 361/711

(56) References Cited

U.S. PATENT DOCUMENTS 4,957,157 * 9/1990 Dowdy et al. .................. 165/104.27
5,142,884 * 9/1992 Scaringe et al. ..................... 62/324.4

OTHER PUBLICATIONS

Hendricks et al., T.J. Thermal Management Issues with Various Space Nuclear Power Alternatives on SSTS Spacecraft, Proceedings of the 24th Intersociety Energy Conversion Engineering Conference, 1989, IECEC 89, pp. 57–62, Mar. 1989.*

Oshima et al., K. Assessment of Grahoff Cooling Potential in Micro Heat Pipes: An Expermental Study, 7th Annual IEEE Semiconductor Thermal Measurement and Management Symposium, SEMI–THERM VII, 1991, p. 73, Aug. 1991.*

Grob et al., E.W. Thermal Design and Verification of the EOS–AM1 Nickel Hydrogen Batteries, Proceedings of the 32nd Intersociety Energy Conversion Engineering Conference, IECEC–97, 1997, vol. 1, pp. 207–212, Jan. 1997.*

Krotiuk, W.J. Engineering Testing of the Capillary Pumped Loop Thermal Control System for the NASA EOS–AM Spacecraft, Proceedings of the 32nd Intersociety Energy Conversion Engineering Conference, IECEC–97, 1997, pp. 1463–1469, Jan. 1997.*

* cited by examiner

Primary Examiner—Kevin J. Teska
Assistant Examiner—Russell W. Frejd
(74) Attorney, Agent, or Firm—T. Gudmestad

(57) ABSTRACT

A terrestrial thermal vacuum system that tests spacecraft by developing a thermal balance having a margin of error of less then 5% and preheats spacecraft prior to terrestrial thermal vacuum testing are disclosed. In operation, working fluid is pumped through a cooling plate that receives heat from the spacecraft and then passes through a heat exchanger where the heat is discarded. The temperature of the working fluid is measured at both the supply and return portions of the cooling plate and the flow rate determined for the fluid. From these measurements an initial heat flow from the spacecraft is determined and an equivalent amount of heat is added back to the spacecraft at the appropriate location. The process is repeated until thermal balance is achieved. Also disclosed is a method for designing the cooling plate used by the above described system.

12 Claims, 10 Drawing Sheets

POWER MEASURING COOLING PLANT SYSTEM AND METHOD

BACKGROUND OF THE INVENTION

1. Field of the Invention

The present invention relates to a thermal balancing system, and in particular to a thermal balancing system and method for terrestrial thermal vacuum testing of spacecraft to simulate on orbit conditions by the replication of the heat transport functions of heat pipes which are dysfunctional due to gravitational forces. The present invention also relates to a system and method for preheating a spacecraft prior to terrestrial thermal vacuum testing, and a method for design of a cooling plate utilized by the above systems.

2. Background of Related Art

Unmanned space vehicles, in particular satellites, are now used for everything from telecommunications to weather reporting to missile defense. With this growing demand has come increased size, complexity, and capability resulting in greater cost. As a result, ever increasing amounts of terrestrial, ground-based, testing are required to ensure that such spacecraft will function properly throughout their effective life.

In its basic elements, a spacecraft can be broken up into six functional groups or subsystems: the spacecraft structure; the power system; the attitude control system; the telemetry, tracking, command and communications system; the propulsion system; and the thermal control system. The thermal control system is an important element as its purpose is to achieve thermal balance of the spacecraft, permitting proper performance of all subsystems during the spacecraft's proposed operational modes. As one might expect, through the various phases of a spacecraft's mission there are variations in heat generation and dissipation due to internal component operation and surface fluxes caused primarily by solar heating and eclipse. As each on board system has a thermal operating range, it is the responsibility of the thermal control system to maintain the temperature of subsystems within their best operating range.

During the initial design phase of a spacecraft, analytical thermal system models are developed. The models not only predict a thermal system balance temperature but also define heat transfer paths for which heat dissipation devices can be strategically placed to discard the waste heat. While these models are adequate for design, the predictions must be verified by actual system testing.

As there is no or negligible air at spacecraft orbital altitudes, the primary heat transfer mechanisms are conduction and radiation. Conductive heat transfer is achieved through material and surface-to-surface contact, while radiative heat transfer is primarily achieved through the use of radiator panels which radiate the heat into deep space. Excess heat generated by internal components or solar heating is conducted from the source to the radiator surfaces, which then rejects the heat to space. While there are a variety of convective heat transfer methods to move the excess heat from the source to the radiative panels, one preferred method is a heat pipe. The advantage of heat pipes is that they typically exhibit thermal conductivity greatly in excess of most thermally conductive metals and transport thermal energy at efficiencies greater then 90%. A heat pipe is a closed loop system which contains an evaporator section, a condenser section, and a working fluid. Should external geometric requirements make it necessary, an adiabatic transport section can be included to further separate the evaporator and condenser portions. Internal to the heat pipe are typically a series of axial grooves which provide a transport path for condensed fluid to flow from the condenser section to the evaporator section.

The heat pipe is mounted such that the evaporator section is attached to a heat source whose temperature is to be maintained within a predetermined range. The condenser section is generally attached to a heat sink such as a space heat radiator for radiation of the heat to space. It is not uncommon for a spacecraft to have several heat pipes, or banks of heat pipes, located throughout the vehicle and oriented in a variety of positions depending upon heat sources and heat sinks.

In operation, the heat generated by a heat source is absorbed by the working fluid in the evaporator section of the heat pipe, vaporizing the working fluid. The vaporization causes an increase vapor pressure difference resulting in the vaporized fluid traveling, inside the heat pipe, from the evaporator section to the condenser section. Since the condenser section is attached to a heat sink, the vaporized fluid reaching the condenser section is cooled, causing it to condense and release the latent heat of vaporization. The condensed working fluid is transferred back to the evaporator section by capillary action, where it is again evaporated, absorbing the heat from the evaporator section.

In a substantially gravity-free space environment, the transfer of the working fluid over the length of the heat pipe is not a problem. However, on Earth gravity may inhibit the return of the working fluid, especially if the condenser section is located below the evaporator section. This is because capillary action of the working fluid in a one-G environment is generally limited to a vertical rise of about 13 millimeters or less. As a result, the functionality of a heat pipe in a terrestrial environment is directly affected by its orientation.

Terrestrial thermal system testing of spacecraft, otherwise known as thermal vacuum testing, is typically done in a large vacuum chamber capable of housing an entire satellite at vacuum levels lower than of $1 \times 10^{-5}$ torr. As a result of the limited capillary rise of a working fluid in a one-G environment, thermal vacuum testing can be quite difficult and give incomplete results. This is due to the fact that often one or more of the heat pipes are oriented in such a manner that they are functionally inoperable because of the gravitational force. While data can be acquired by those systems that are functional, such testing cannot develop a complete thermal balance for the entire vehicle. As a result, either multiple tests run must be conducted with the spacecraft manually repositioned to different orientations, or the spacecraft must be mechanically rotated during test. While these approaches provide additional data with respect to the functionality of the thermal control system, such testing can still not provide a complete thermal balance since not all systems are functional at the same time. In addition to the inability to provide a thermal balance, such alternate approaches are costly both in material and man-hours. Each manual repositioning of the satellite requires the test chamber to be vented to the atmosphere, the satellite rotated, a full pump-down cycle completed, and the spacecraft thermally stabilized. It can take from 12 to 48 hours between successive tests. If the satellite is rotated within the chamber during test, special tooling must be designed and manufactured. This tooling must not only be capable of supporting and rotating the satellite during test, but also withstanding the thermal and vacuum environment.

There is thus a need for method that would permit full thermal system testing of spacecraft in a single test cycle and provide a system thermal balance. Additionally, such a system should be able to provide a full system balance within a margin of error of 10% or less, preferably 5% or less.

SUMMARY OF THE INVENTION

The present invention is directed to a system and method for terrestrial thermal vacuum testing of spacecraft which is capable of developing a system thermal balance within a 5% error. This is accomplished by attaching a cooling plate to a heat source on a spacecraft which extracts heat from the source, conducts it through a series of working fluid lines and discards the heat at a cooling cart. Heat flow is calculated by measuring the temperature of the working fluid both before and after entering the cooling plate and measuring the fluid flow rate for the system. Based on the initial heat flow calculation an equivalent amount of heat is added back to the spacecraft at an appropriate location thus simulating on-orbit conditions. A second measurement is read for the system and the corresponding heat load delivered. This process is repeated until thermal balance is achieved, i.e. the measured heat flow values do not change. The system is preferably used in situations in which heat pipes onboard the spacecraft are disfunctional due to Earth's gravitational force.

The present invention also addresses the design and selection of the cooling plate which is based on both the physical constraints of the spacecraft and the proposed heat load. Based on the data derived from analytical system thermal models, the physical constraints of the cooling plate, the working fluid chosen and the pressure limitations of the system, a determination is made as to the number and size of through fluid passageways needed in the cooling plate. The cooling plate is fabricated based on the results of this analysis.

The present invention is also directed to preheating a spacecraft prior to terrestrial thermal vacuum testing. In such a case, the above-described system is operated prior to spacecraft activation. A heat extraction system in the cooling cart is deactivated and a heating unit, also located within the cooling cart, is operated to heat the working fluid, which is pumped into the cooling plate passing the heat to the spacecraft. The cooled working fluid is then returned to the cooling cart to be reheated, continuing the cycle. The use of the system to preheat the spacecraft reduces the time required for the spacecraft to reach its specific thermal state before commencing thermal vacuum testing, resulting in shorter test cycles and less cost.

BRIEF DESCRIPTION OF THE DRAWINGS

These and other features, aspects, and advantages of the present invention will be apparent to those skilled in the art from the following detailed description together with the accompanying drawings in which.

DETAILED DESCRIPTION OF THE INVENTION

The present invention is for a system and a method for conducting system thermal balancing of a spacecraft housed in a thermal vacuum chamber. The present invention is typically used in situations in which heat transfer systems on a spacecraft are dysfunctional due to a combination of their orientation and gravity. The system of the present invention extracts heat from a heat generating surface on a spacecraft, determines the heat flow from the surface and supplies an equivalent amount of heat back to the spacecraft at a specified location. This process is repeated until a point at which the measured heat flow remains constant, this is the thermal balance point.

Figure 1:
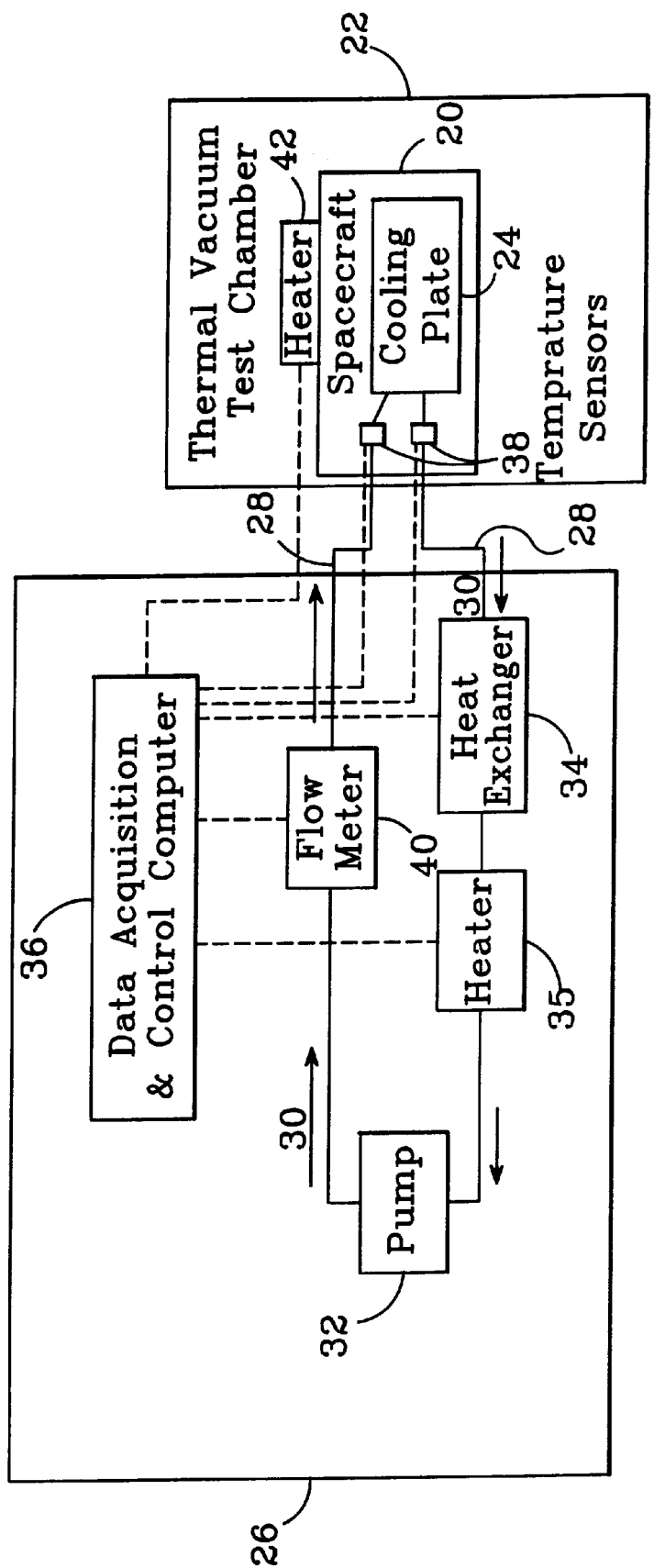
FIG. 1 is a block diagram of the power measuring cooling plate system.

The system of the present invention, as depicted in FIG. 1, is used for terrestrial thermal testing of a spacecraft 20 located within a thermal vacuum chamber 22. Attached to a heat generating surface on spacecraft 20 is a cooling plate 24 which in turn is connected to a cooling cart 26 via a set of working fluid lines 28. A working fluid 30 is pumped, by a magnetic gear drive fluid pump 32, between cooling plate 24 and cooling cart 26 receiving heat from spacecraft 20 and discarding the added heat at a heat exchanger 34. If necessary, working fluid 30 can be heated by an immersion heater 35 to compensate for excess heat dissipated by heat exchanger 34. Heat flow from spacecraft 20 is determined by a data acquisition and control computer 36 based on the temperature data received from a plurality of temperature sensors 38 and fluid flow rate data received from a turbine flow meter 40. An amount of heat equivalent to that extracted by cooling plate 24 is reintroduced back to spacecraft 20 at a secondary location by spacecraft heater 42 simulating on orbit conditions. The above process is repeated until a point at which measured heat flow values remain constant, at this point thermal balance is achieved.

Figure 2:
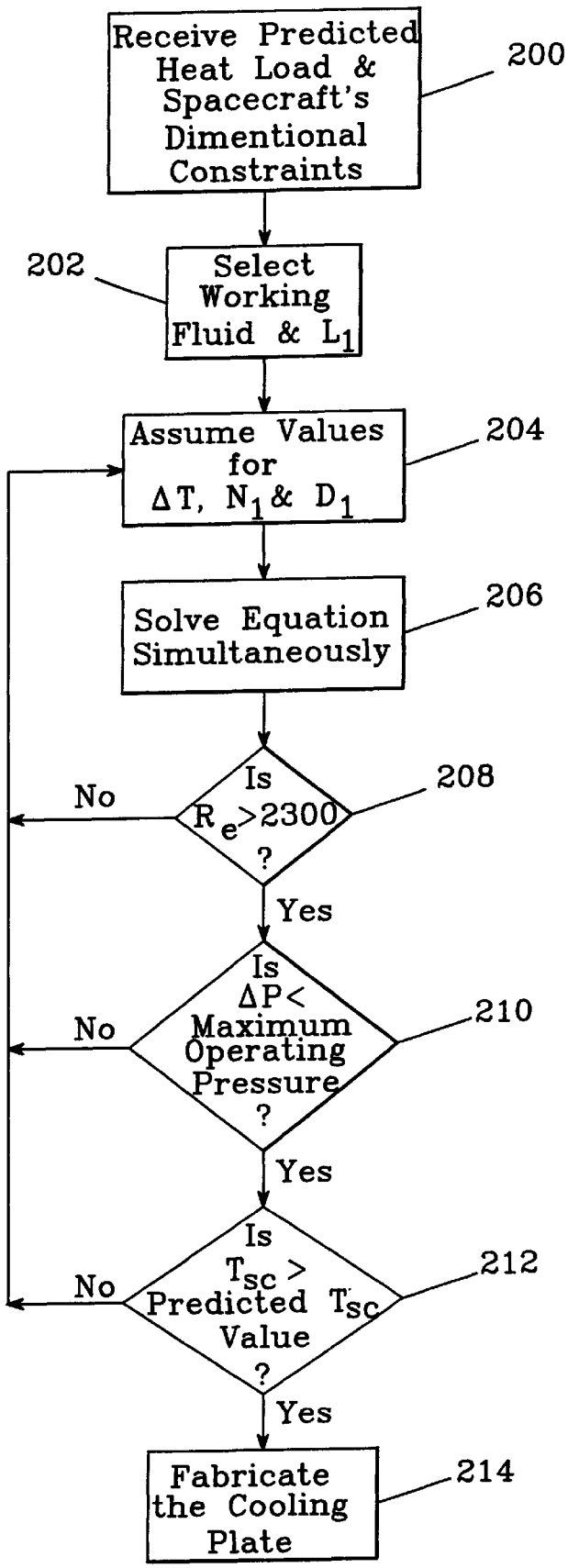
FIG. 2 is a flow chart depicting the steps for the design and selection of a cooling plate.

The use of the power measuring cooling plate system begins with the design and selection of the cooling plate 24 as depicted in FIG. 2. During the initial stages of a spacecraft's design several computer models are developed. These models provide the cooling plate designer with predicted heat load requirements and dimensional constraints for spacecraft 20 (step 200). The heat load requirements consist of the predicted heat flow ($\dot{Q}$) for spacecraft 20 and the predicted temperature of the cooling plate mounting surface on the spacecraft ($T_{sc}$) to which the heat is to be conductively transferred. The dimensional constraints of spacecraft 20 determine the maximum size of cooling plate 24, in particular its cooling passageway length ($L_1$). Based on the proposed heat load, an initial working fluid 30 is selected (step 202). Once initial working fluid 30 is selected and the physical constraints of the cooling plate 24 are defined, an initial set of assumptions are made, including: $\Delta T$ (temperature of working fluid 30 measured at the supply end of cooling plate 24—temperature of working fluid 30 measured at the return end of cooling plate 24; $N_1$ (number of fluid passageways 43 within the cooling plate 24); and $D_1$ (the diameter of base plate through fluid passageways 43) (step 204). The accuracy of temperature sensing device 38 governs the $\Delta T$ value, which is chosen to maximize the measurement accuracy. $\Delta T_{out-in}$ is chosen such that the measurement accuracy error between $\Delta T$ and $\dot{V}$ (volumetric flow rate of working fluid 30) is balanced to minimize root mean squared error factor. Based on the above defined constants ($\dot{Q}, L_1$), the physical properties of the working fluid 30, and the assumed variables ($\Delta T, N_1, D_1$), the equations 1, 2, 3, and 4 are simultaneously solved (step 206):

$$\dot{V} = \frac{\dot{Q}}{\rho C_p \Delta T_{OUT-IN}} \qquad (1)$$

where:

$$\Delta T_{OUT-IN} = T_{f,out} - T_{f,in} = \frac{\dot{Q}}{\rho C_p \dot{V}} \quad (2)$$

$$Re_1 = \frac{V_1 D_1}{\nu} = \left(\frac{4}{\pi}\right)\left(\frac{\dot{V}}{N_1 D_1 \nu}\right)$$

$$\Delta p = \frac{1}{2}\rho V_1^2 \left[f_1\left(\frac{L_1}{D_1}\right) + \sum_{j=1}^{m}(K_{LOSS})_j\right]_{\substack{\text{Within} \\ \text{Cooling} \\ \text{Plate}}} + \quad (3)$$

$$\frac{1}{2}\rho V_2^2 \left[f_2\left(\frac{L_2}{D_2}\right) + \sum_{l=1}^{q}(K_{LOSS})_l\right]_{\substack{\text{Outside of} \\ \text{Cooling Plate}}}$$

$$\approx \frac{1}{2}\rho\left(\frac{4\dot{V}}{\pi N_1 D_1^2}\right)^2 \left[(0.0813 - 0.01216\log_{10}[Re_1])\left(\frac{L_1}{D_1}\right) + K_{LOSS}\left[2 \times \frac{L_1}{L_{ref}}\right]\right] +$$

$$\frac{1}{2}\rho\left(\frac{4\dot{V}}{\pi D_2^2}\right)^2 \left[(0.0813 - 0.012161\log_{10}[Re_2])\left(\frac{L_2}{D_2}\right) + K_{LOSS}(N_2)\right]$$

where:

$$Re_2 = \frac{V_2 D_2}{\nu} = \left(\frac{4}{\pi}\right)\left(\frac{\dot{V}}{D_2 \nu}\right)$$

$$f \approx 0.0813 - 0.01216 \log_{10}(Re) \quad (4)$$

$$V_1 = \frac{4\dot{V}}{\pi N_1 D_1^2}$$

$$V_2 = \frac{4\dot{V}}{\pi D_2^2}$$

$$T_{sc} = \frac{\dot{Q}}{G_{sc-s}} + T_s = \frac{\dot{Q}}{G_{sc-s}} + \left[\frac{\dot{Q}}{\eta h_f A_{fs}} + T_{f,avg}\right]$$

where:

$$\dot{Q} = G_{sc-s}(T_{sc} - T_s)$$

$$T_s = \frac{\dot{Q}}{\eta h_f A_{fs}} + T_{f,avg} = \left(\frac{1}{\eta}\right)\left(T_{fs} + \left(1 - \frac{1}{\eta}\right)\right)T_{f,avg}$$

$$\dot{Q} = \eta h_f A_{fs}(T_s - T_{f,avg}) = h_f A_{fs}(T_{fs} - T_{f,avg})$$

for turbulent flow, where $Re_1 > 2300$ and where $$\frac{\nu \rho c_p}{k} > 0.5$$

$$h_f A_{fs} = 0.023 \frac{4^{0.8} \pi^{0.2} k^{0.67} \dot{V}^{0.8} \rho^{0.33} c_p^{0.33} N_1^{0.2} L_1 1.0}{\nu^{0.47} D_1^{0.8}}$$

$$T_{f,avg} = \frac{T_{f,out} - T_{f,in}}{2}$$

-continued $$h_f \approx \frac{k}{D_1}\left[0.023\left(\frac{V_1 D_1}{\nu}\right)^{0.8}\left(\frac{\nu \rho c_p}{k}\right)^{0.33}\right]$$

$$= \frac{k}{D_1}\left[0.023\left(\frac{4\dot{V}}{\pi N_1 D_1 \nu}\right)^{0.8}\left(\frac{\nu \rho c_p}{k}\right)^{0.33}\right]$$

$$= 0.023\left[\frac{k^{0.67}}{D_1^{1.8}}\left(\frac{4}{\pi}\right)^{0.8}(\nu \rho c_p)^{0.33}\right]$$

$$= 0.023\left(\frac{4}{\pi}\right)^{0.8} \frac{k^{0.67} \dot{V}^{0.8} \rho^{0.33} c_p^{0.33}}{\nu^{0.47} N_1^{0.8} D_1^{1.8}}$$

Where:
  $\dot{V}$=volumetric flow rate of working fluid 30 (m³/sec);
  $\dot{Q}$=heat flow (watts);
  $\rho$=density of working fluid 30 (kg/m³);
  $c_p$=heat capacity of working fluid 30 (J/kg ° k);
  $T_{f,out}$=temperature of working fluid 30 at the outlet of cooling plate 24 (° k);
  $T_{f,in}$=temperature of working fluid 30 at the inlet of cooling plate 24 (° k);
  $Re_1$=average Reynolds number of a fluid passageway 43 within the cooling plate 24 (unitless);
  $Re_2$=average Reynolds number of a fluid passageway outside of the cooling plate 24 (unitless);
  f=friction factor within the fluid passageway (unitless);
  $V_1$=average fluid velocity within the cooling plate flow passageway 43 (m/sec);
  $V_2$=average fluid velocity within the cooling line outside of cooling plate 24 (m/sec);
  $\nu$=kinematic viscosity of working fluid 30 (m²/sec);
  $D_1$=diameter of a fluid passage way 43 (m);
  $N_1$=number of fluid passageways 43 (unitless);
  $Ac_1$=cross-sectional area of fluid passageway 43 within cooling plate 24 (m²);
  $\Delta P$=total pressure drop across the power measuring cooling plate system (N/m²);
  $L_1$=combined length of fluid passageways 43 (m);
  $L_{1,ref}$=length of a single passageway 43 of fluid within the cooling plate 24 (m);

$$2\left[\frac{L_1}{L_{ref}}\right] \cong \text{number of } 90° \text{ bends (unitless)};$$

number of 90° bends (unitless);

$K_{LOSS}$=head loss coefficient (unitless);

$L_2$=length of working fluid line 28 and bayonets 44 (m);

$D_2$=average inside diameter of working fluid line 28 and bayonets 44 (m);

$Ac_2$=cross sectional area of fluid passageway outside of cooling plate 24 (m$^2$);

$N_2$=number of 90° bends outside of cooling plate 24 (unitless);

$h_f$=heat transfer coefficient of working fluid 43 within the cooling plate fluid passageway 43

$$\left(\frac{W}{°Km^2}\right);$$

$A_{fs}$=surface area of cooling fluid passageway 43 within the cooling plate 24 (m$^2$);

$T_{fs}$=fluid passageway surface temperature within the cooling plate 24 (° k);

$T_{f,avg}$=average fluid temperature within the cooling plate 24 (° k);

η=thermal efficiency of cooling plate 24 (unitless);

$T_s$=mounting surface temperature on the cooling plate where it will be mounted to spacecraft 20 (° k);

$T_{sc}$=mounting surface temperature on the spacecraft 20 where cooling plate will be mounted (° k); and $G_{sc-s}$=interface thermal conductance between the cooling plate 24 and the spacecraft mounting surface (w/° k).

The above equations 1, 2, 3 and 4 are iterated by changing the variables $D_1$ and $N_1$, and if necessary ΔT until; the Reynolds number is greater then 2300 (step 208) to assure that the flow is in the turbulent region to maximize heat transfer, ΔP value is less then maximum operating pressure for the system (step 210), and $T_{sc}$ is less then the predicted temperature of the transfer surface (step 212). When these conditions have been satisfied the corresponding $D_1$ and $N_1$ then define the physical structure of base plate 45 for fabricating cooling plate 24 (step 214).

Figure 3:
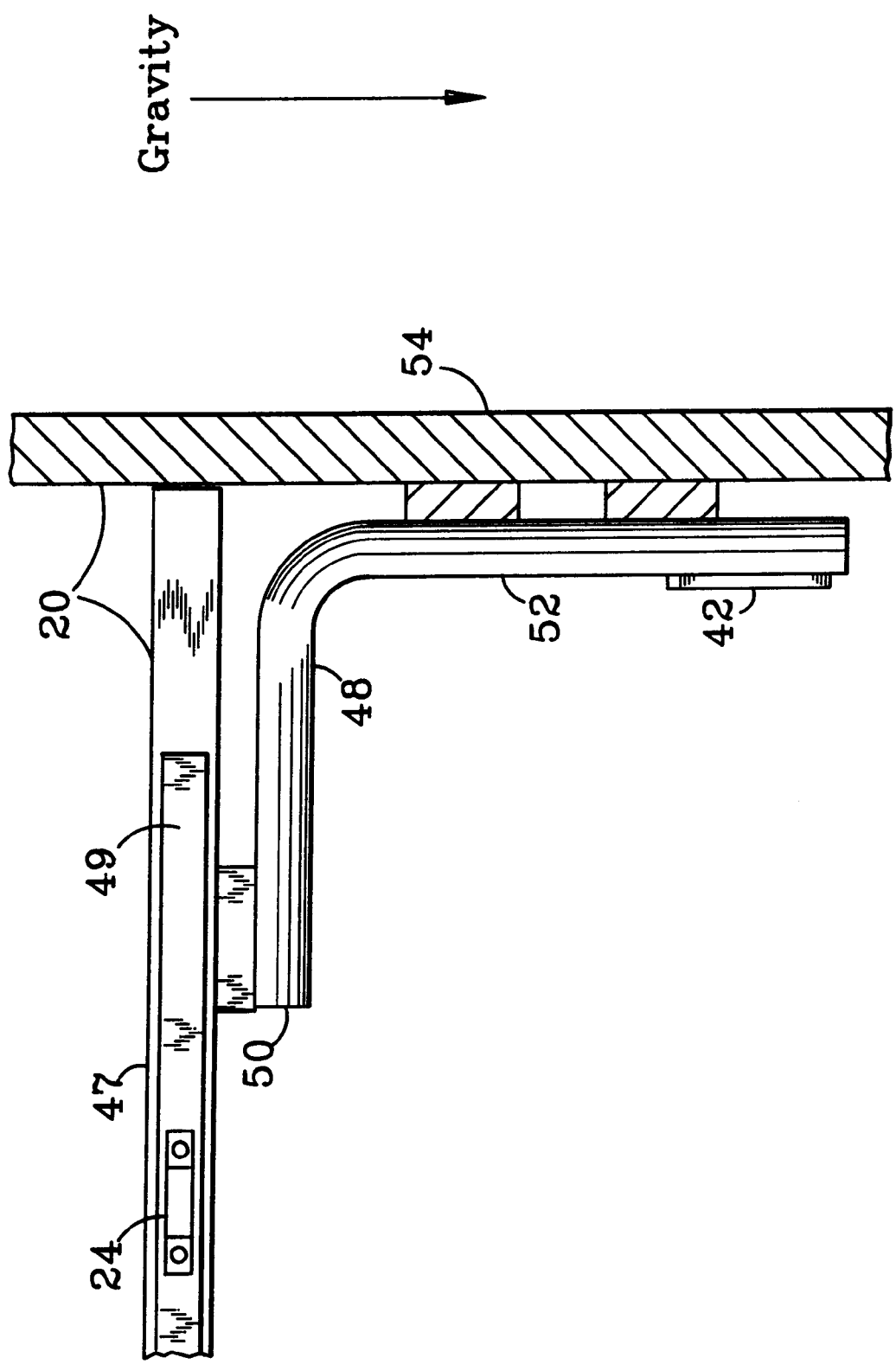
FIG. 3 is an elevation view of a heat pipe system.

Once cooling plate 24 has been fabricated, the face surface 46 is attached, adjacent to, or directly upon, the spacecraft's heat generating surface 47. Cooling plate 24 can be attached to a variety of surfaces on spacecraft 20, commonly to a spacecrafts heat pipe 49 or towards the evaporator section 50 of heat pipe 48. At, or adjacent to, the condenser end 52 of the heat pipe 48 is commonly located spacecraft heater 42 used to introduce heat back to the radiative surface 54 of spacecraft 20, see FIG. 3.

The method of attachment of face surface 46 to surface 47 can vary depending on the expected $\Delta T_{interface}$ which is equal to $T_{sc}-T_s$. If $\Delta T_{interface}$ is large, the sensitivity with respect to the measurement of heat transfer is not as critical and as such, thermal bonding between the surfaces (46/47) is also not as critical and thus a variety of techniques know to those skilled in the art can be used, for example bolting or adhesives. It is desired to have $\Delta T_{interface}$ small, so the bond interface between surfaces 46 and 47 must be a good thermal interface, for example a solder joint. If the method of attachment chosen is soldering, then depending upon the material selected for base plate 45, special surface preparation might be required for surface 46.

Figure 4:
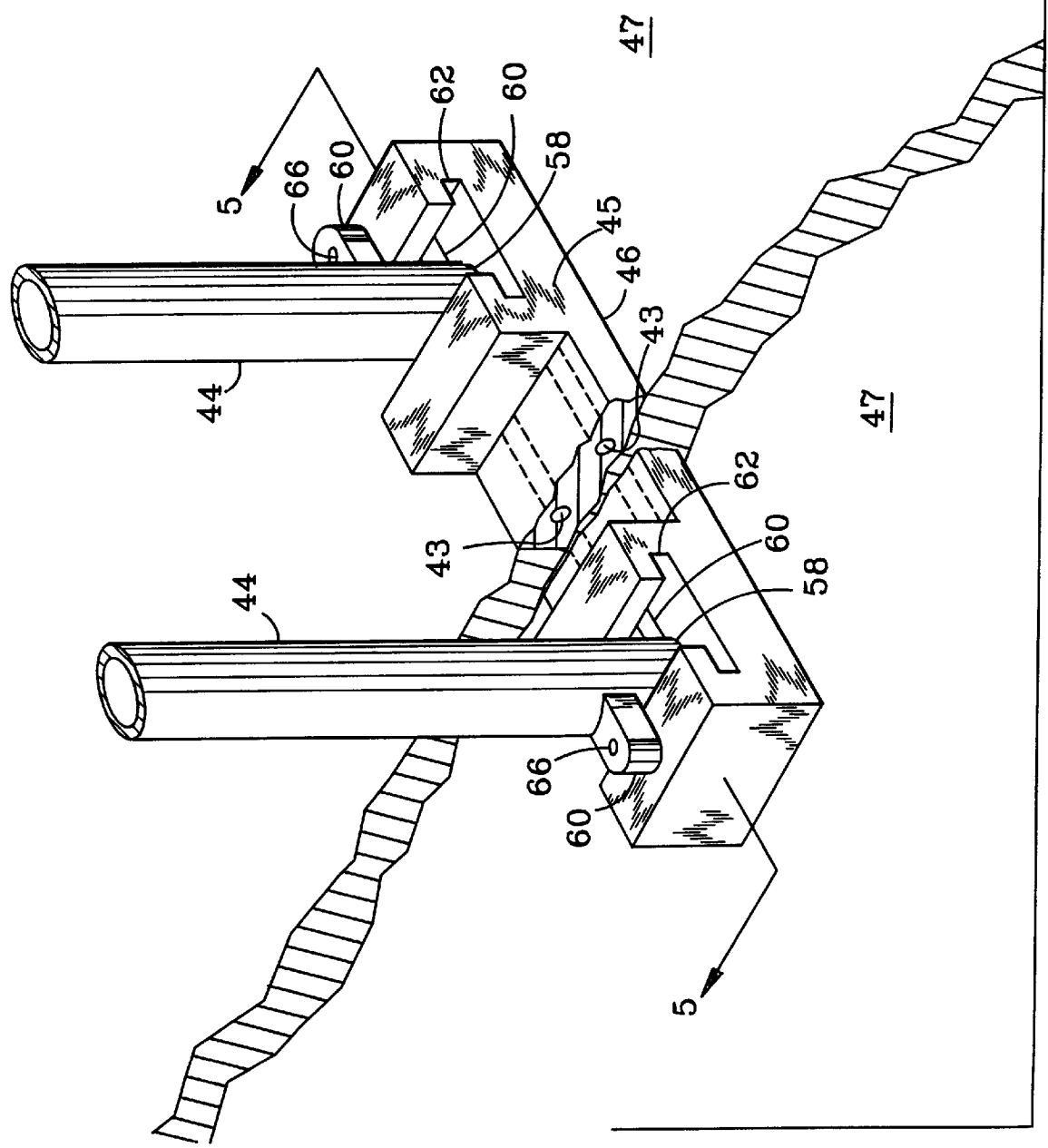
FIG. 4 is a broken perspective view of the cooling plate.
Figure 5:
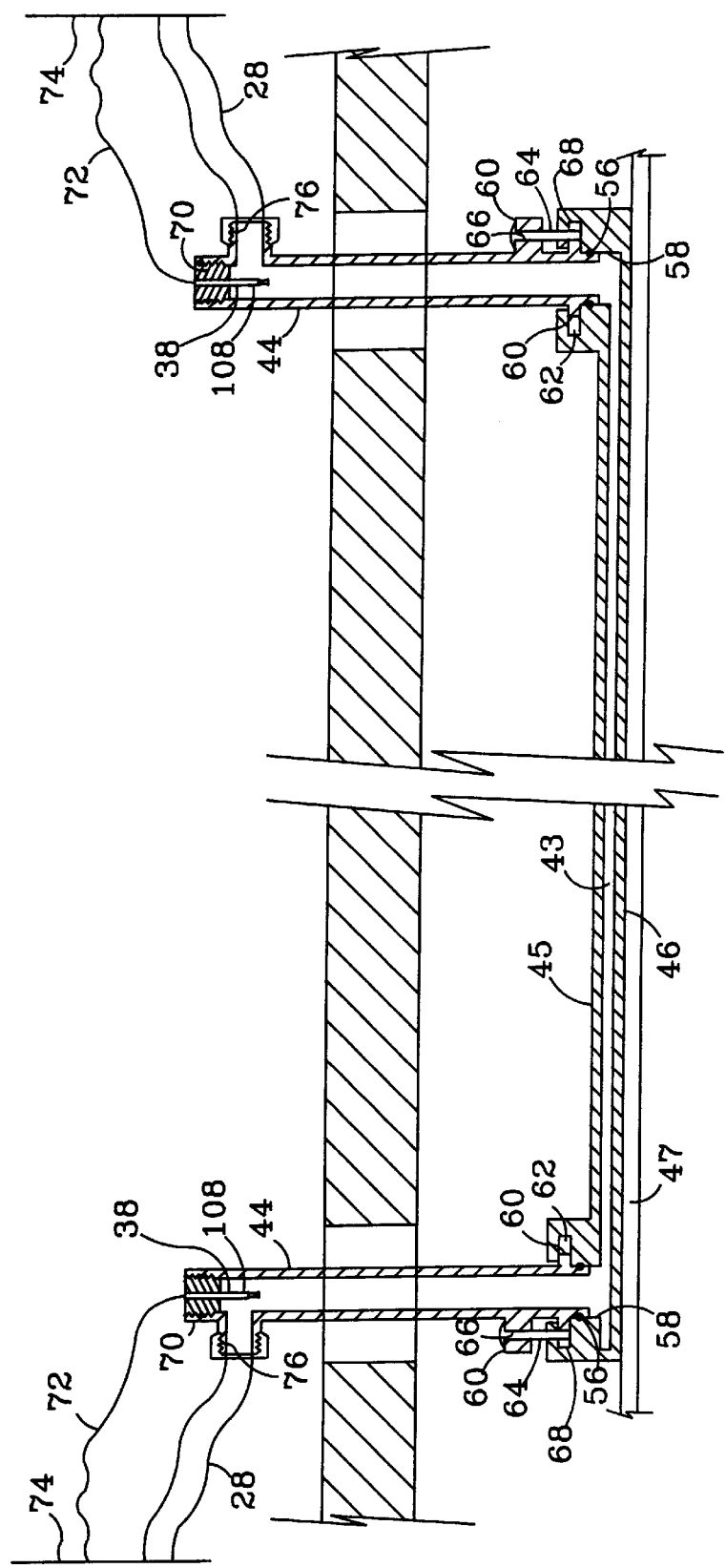
FIG. 5 is a broken sectional view of the cooling plate taken along section lines 5—5 of FIG. 4.

After attachment of base plate 45 to surface 47, spacecraft 20 is placed in a secured test structure in thermal vacuum chamber 22. A plurality of Bayonets 44, namely a supply and return bayonet, are inserted into base plate 45 sealing the bore with an O-ring 56 against the base plate bore 58 and then rotated to lock bayonet locking flange 60 into base plate locking slot 62. A locking fastener 64 is passed through holes 66 and 68 to prevent bayonet rotation. A temperature sensor 38 is installed in a first aft end opening 70 of both bayonets 44 and connected with a temperature sensor wire 72 to the inside surface of a chamber feed through 74. A second aft end opening 76 on both bayonets 44 is connected to feed through 74 by a working fluid line 28 and leak checked, see FIGS. 4 and 5.

Figure 6:
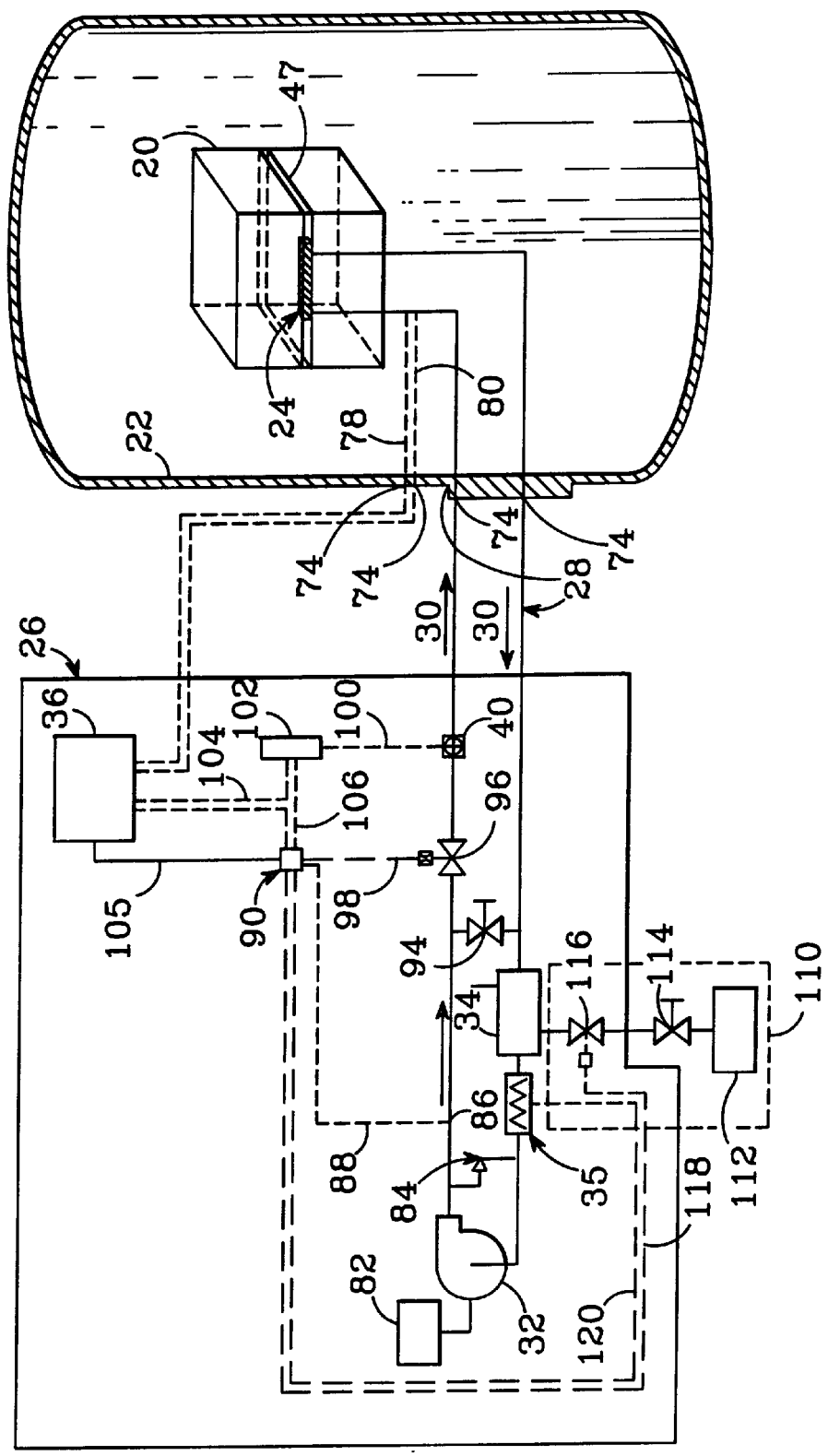
FIG. 6 is a schematic diagram of the power measuring cooling plate system.
Figure 7:
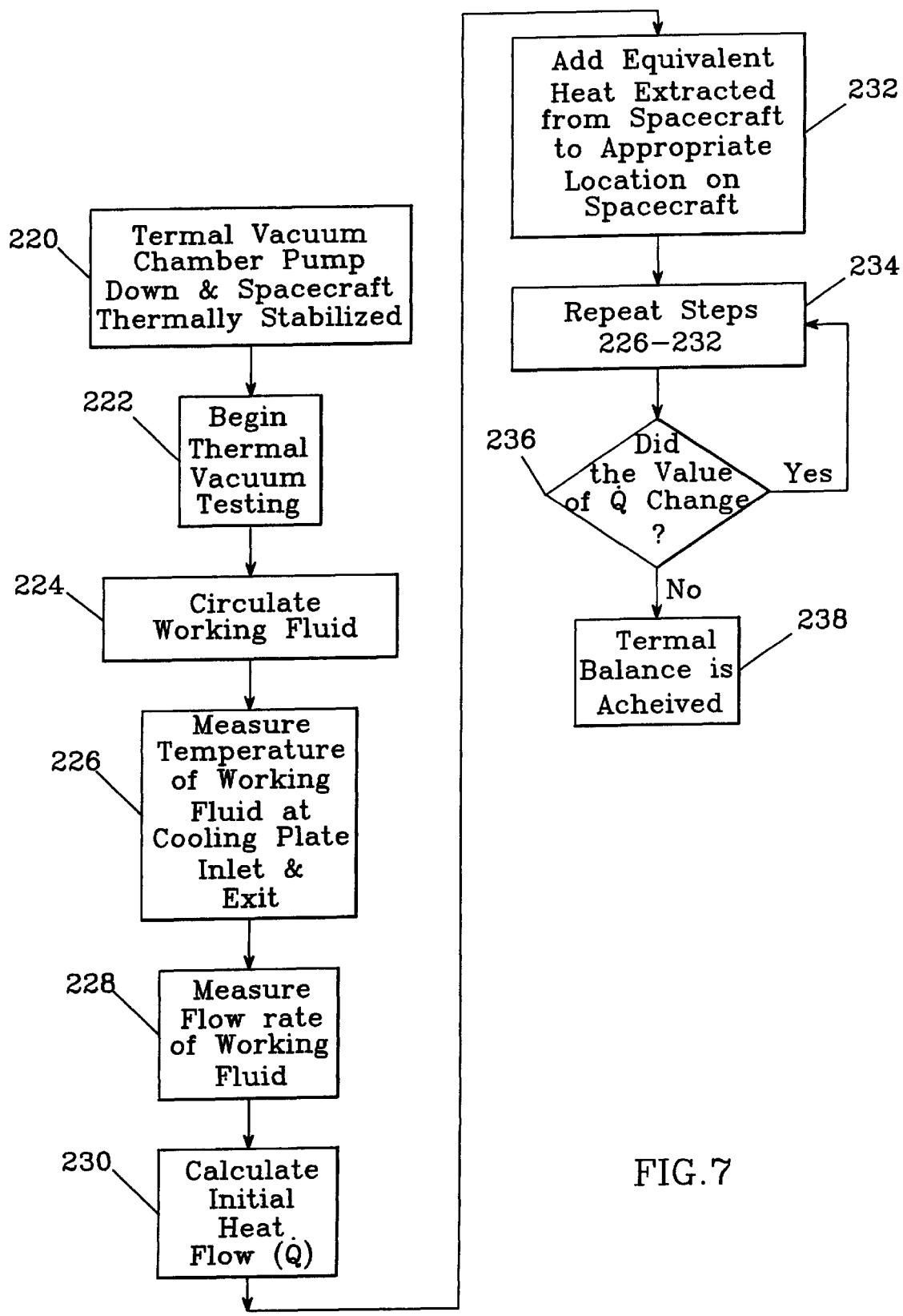
FIG. 7 is a flow chart depicting the steps for conducting a thermal balance for a spacecraft.

Once cooling plate 24 has been designed, fabricated and attached to the heat generating surface 47 of spacecraft 20, it is connected to cooling cart 26 as shown in FIG. 6 and depicted in flow chart 7. In FIG. 6, electrical connectors 78 and 80 are fastened to the outside surface of chamber feed through 74 and the data acquisition and control computer system 36. A working fluid line 28 is also attached to the outside surface of chamber feed through 74 for both supply and return bayonet connecting them to cooling cart 26 (step 218).

Upon connection of cooling plate 24 to cooling cart 26, working fluid 30 is added in sufficient quantity to fill the system and the working fluid reservoir 82. Thermal vacuum chamber 22 is then sealed and the system pumped down to the required temperature and pressure levels (step 220). Upon achieving the required environmental conditions, several spacecraft systems are activated allowing the spacecraft to thermally stabilize at which point both spacecraft 20 and the power measuring cooling plate system of the present invention are fully activated and commence thermal vacuum testing (step 222).

During operation, magnetic gear drive fluid pump 32 circulates working fluid 30 throughout the system. Working fluid 30 flows from pump 32 through a pressure relief valve 84 which is used to protect the system from over-pressurization. The working fluid 30 flows over a set of thermal couple probes 86 immersed within the flow stream which measure the temperature of the working fluid 30. The probes 86 send this information, via electrical connector 88, to a proportional integral derivative (PID) controller 90 which among other things controls an immersion heater 35. The working fluid 30 passes a manual by-pass ball valve 94 which diverts a portion of working fluid 30 reducing the flow rate to the rest of the system. The diverted working fluid 30 is reintroduced to the system at a point in front of single pass counter flow heat exchanger 34.

The remaining portion of fluid 30 flows into a motorized flow control ball valve 96, which, like valve 94, is used to further regulate the flow rate of working fluid 30 entering the remainder of the system. Ball valve 96 is connected to and receives control signals from PID controller 88 via electrical connector 98. The working fluid 30 exiting ball valve 96 flows through turbine flow meter 40 which measures the flow rate of working fluid 30. Flow rate information is sent, via electrical connector 100, to a flow indicator 102 which in turn sends the data, via electrical connectors 104 and 106, to both the data acquisition and control computer system 36 and the PID controller 90 which are in turn connected by an electrical connector 105.

The working fluid 30 exits cooling cart 26 and enters a working fluid line 28, which is connected to chamber feed through 74, passes through feed through 74 and into a second working fluid line 28 connected to second aft end opening 76 of bayonet 44. The working fluid 30 enters the second end opening 76 where it flows over a temperature sensor 38 housing a Resistance Temperature Device (RTD) sensor 108. RTD sensor 108 is connected and sends signals to a Hewlett Packard 3852 data acquisition unit (not shown) which in turn sends signals to an IBM compatible personal computer (not shown).

The working fluid 30 flows into base plate 45 where it receives heat conducted from spacecraft 20, exits base plate 45 and enters return bayonet 44 where it flows over a second temperature sensor 38 housing a second RTD temperature sensor 108. Like the first, the second RTD temperature sensor 108 sends a signal to the Hewlett Packard 3852 data acquisition unit which in turn sends a signal to the personal computer. Heated working fluid 30 exits return bayonet 44 entering a working fluid line 28 which is connected to chamber feed through 74, passes through chamber feed through 74 and into another working fluid flow line 28 which is connected to the entrance of cooling cart 26. Heat exchanger 34 cools the working fluid 30 by conductively passing the heat to a separate cooling fluid system 110.

Cooling fluid system 110 supplies heat exchanger 34 with a cooling fluid, commonly liquid nitrogen, which is provided by a cooling fluid supply 112 passing through a cooling system shut-off manual ball valve 114 and through a cooling system cryogenic solenoid valve 116. Ball valve 114 is used to shut off the flow of the cooling fluid to heat exchanger 34 and solenoid valve 116 is used to regulate the flow rate, which in turn regulates the amount of heat extracted from the working fluid 30. Additionally, solenoid valve 116 is connected to, via electrical connector 118, and controlled by, PID controller 90. The cooled working fluid 30 exits heat exchanger 34 and enters an immersion heater 35 where, if necessary, is heated to make up for excess heat extraction caused by heat exchanger 34. Immersion heater 35, like solenoid valve 116, is connected to, via electrical connector 120, and controlled by, PID controller 90. From immersion heater 35 working fluid 30 flows back through the fluid pump 32 completing the cycle (step 224).

The temperature of working fluid 30 is measured at both supply and return bayonets 44 and sent to the data acquisition unit, which in turn sends the data to the personal computer (step 226). The data acquisition unit also receives flow rate signals from flow indicator 102, previously received from flow meter 40 (step 228), which are in turn sent to the personal computer. The personal computer calculates an initial heat flow ($\dot{Q}$) from spacecraft 20 based on above equation (1) and the extrapolated curvilinear equations for $\rho$ and $C_p$ of working fluid 30 (step 230). Based on the initial heat flow calculation, spacecraft heater 42 adds an equivalent amount of heat back to the spacecraft 20 (step 232), commonly at condenser section 52 of heat pipe 48. A second measurement is then read for the system and the heat input adjusted to reflect the measured change (step 234). This process is iterated (step 236) until the thermal balance is achieved (step 238), i.e. the point at which an increase in heat supplied back to spacecraft 20 has no effect on the heat load determined by the power measuring cooling plate system. With a proper design of cooling plate 24 and selection of an appropriate turbine flow meter 40 and RTD temperature sensors 108, a thermal balance can be achieved with an error of less then 5%.

Figure 8:
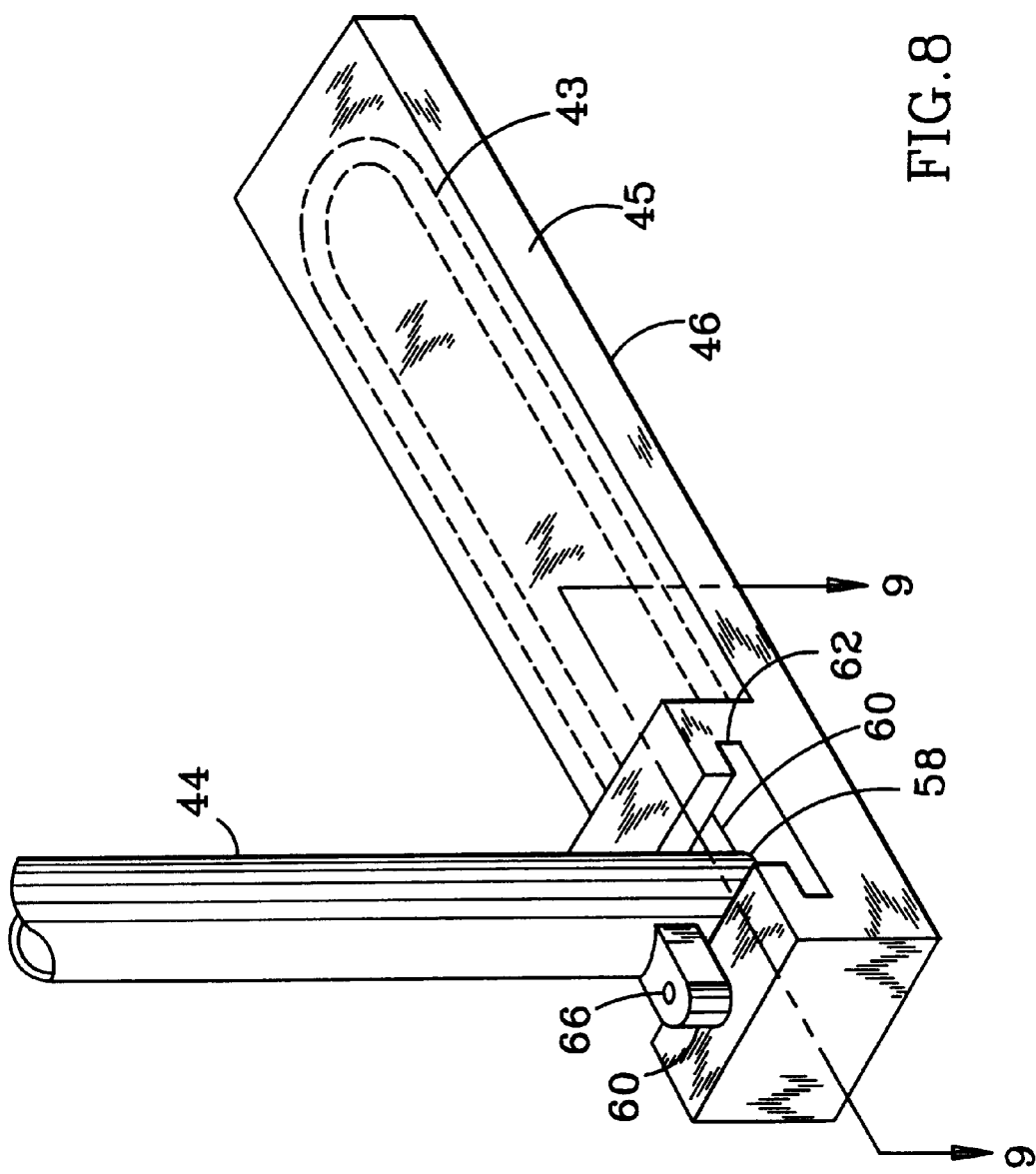
FIG. 8 is a partially perspective view of a single bayonet cooling plate.
Figure 9:
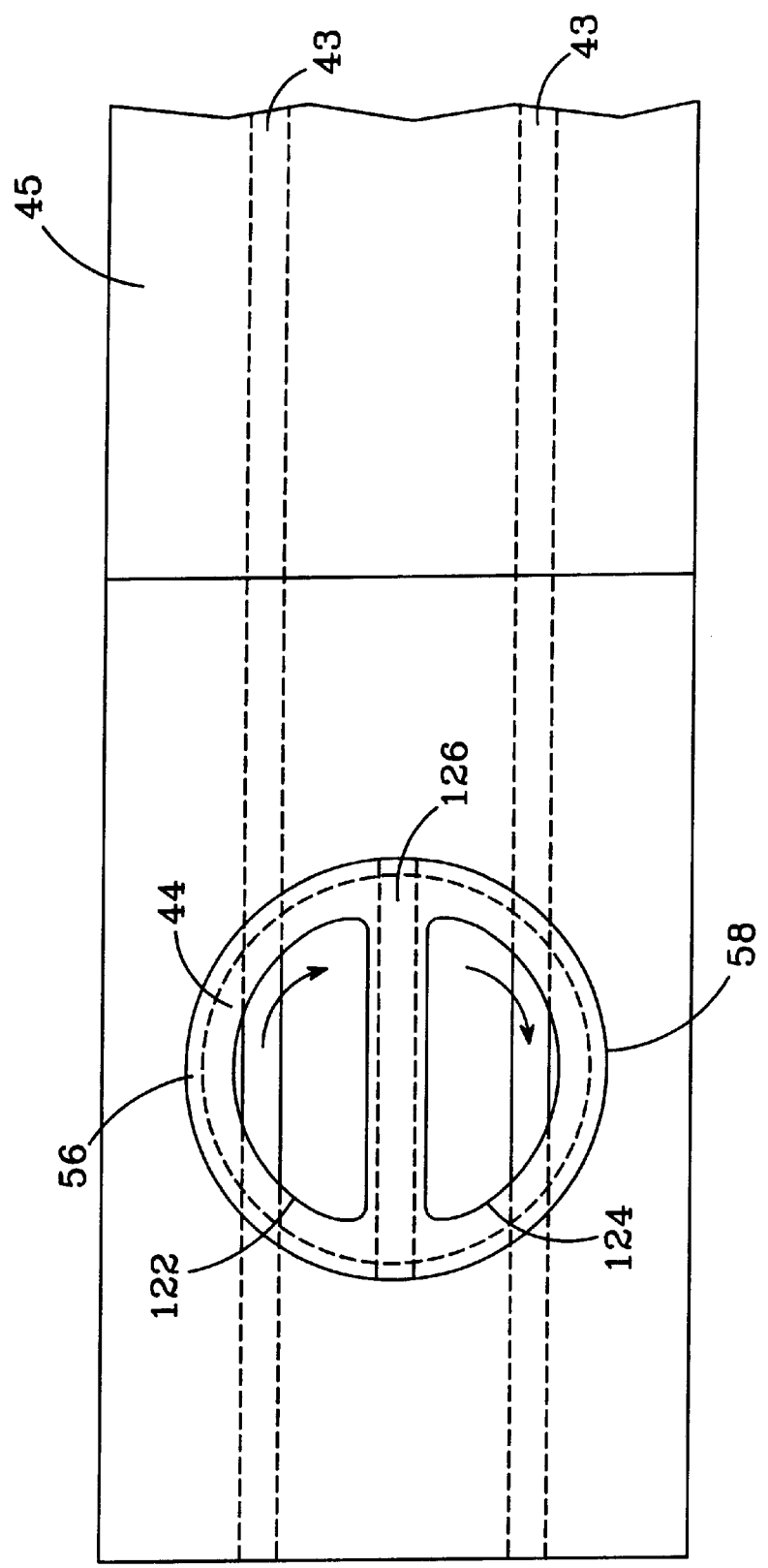
FIG. 9 is a broken sectional view of the cooling plate taken along section lines 9—9 of FIG. 8.

In an alternate embodiment, as shown in FIGS. 8 and 9, the present invention is directed to cooling plate 24 consisting of a single bayonet 44 with two or more through fluid passageways for passing working fluid 30. Base plate 45 contains one or more base plate through fluid passageways 43 forming a variety of shapes such as a loop. In a single bayonet system, bayonet 44 contains a first through fluid passageway 122 for suppling working fluid 30 to base plate 45 and a second through fluid passageway 124 for the return of heated working fluid 30 after passing through base plate 45. Located at the forward end of the bayonet 44, between the bayonets through fluid passageways, is a bayonet sealing device 126 such as a rubber gasket. The device seals against the bottom of base plate bore 58 creating a fluid tight seal and separating the inlet and outlet through fluid passageways.

Figure 10:
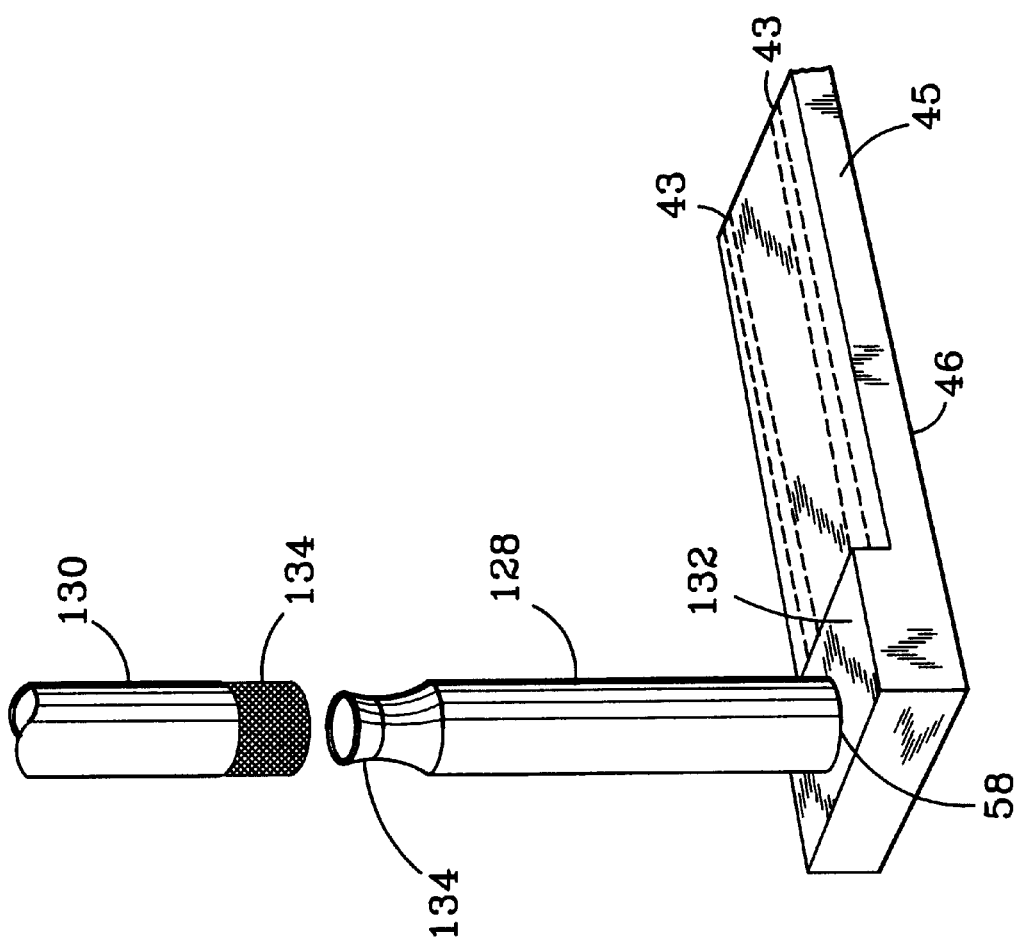
FIG. 10 is a partial perspective view of an alternate bayonet cooling plate configuration.

In a second alternate embodiment, as shown in FIG. 10, bayonet 44 consists of two or more section, namely a first bayonet section 128 and second bayonet section 130. The forward end of first bayonet section 128 is attached to base plate back surface 132 in the same manner as discussed above, or permanently attached by an attachment means such as welding or soldering. The aft end of first bayonet section 128 contain one half of a leak-free bayonet connector 134 with the second half attached to the forward end of bayonet section 130. The aft end of the second bayonet section 130 contain two or more first openings 70 for attachment of temperature sensor 38 and two or more second openings 76 for attachment of working fluid line 28 as described above.

The present invention is also directed to a system for preheating a spacecraft prior to terrestrial thermal vacuum testing. In such a case, the power measuring cooling plate system of the present invention is operated prior to spacecraft activation with heat exchanger 34 deactivated, by electromagnetically closing valve 116, and immersion heater 35 activated to heat working fluid 30. Heated working fluid 30 is pumped, as described above, through the system 30 entering cooling plate 24, passing heat to spacecraft 20 and in return cooling working fluid 30. The cooled working fluid 30 is then returned through the immersion heater 35 where it is reheated, completing the cycle.

The power measuring cooling plate system of the present invention has many advantages over presently available methods for thermal vacuum testing including the fact that the present system permits not only the generation of a system thermal balance, but also provides a method for developing a system thermal balance within an error of 5% or less. In addition, the above system and cooling plate provide a method for preheating a spacecraft situated in a thermal vacuum chamber, thus reducing the time and cost required for a spacecraft to reach its specific thermal state before commencement of thermal vacuum testing.

Although the present invention has been described in considerable detail with reference to certain preferred versions thereof, other versions are possible. Therefore, the spirit and scope of the appended claims should not be limited to the description of the preferred version contained herein.

We claim:

1. A method for constructing a cooling plate for the thermal testing of spacecraft, that has one or more fluid passageways and is part of a cooling system, comprising the steps of:

determining predicted heat loads for said spacecraft ($\dot{Q}$);

determining cooling plate mounting surface temperature ($T_{sc}$) of spacecraft where the cooling plate is to conductively transfer heat, determining physical constraints for the attachment of said cooling plate to said spacecraft with respect to the cooling plates length ($L_1$), selecting a fluid, making an assumption as to the difference in temperature between said fluid entering said cooling plate and said fluid exiting said cooling plate ($\Delta T$), making an assumption as to the number of fluid passageways ($N_1$) in said cooling plate, making an assumption as to the diameter of the fluid passageways ($D_1$) in said cooling plate, determining the flow rate of the fluid ($\dot{V}$), determining the Reynolds number for the fluid passageways (Re), determining the pressure drop for the cooling system ($\Delta P$), determining the surface temperature of the spacecraft to which the heat is to be conductively transferred ($T_s$), repeating the above steps until the desired values for Re, $\Delta P$, and $T_s$ are achieved, and constructing a cooling plate having physical parameters that satisfy said desired values.

2. The method of claim 1, wherein said desired value for Re is greater then 2300.

3. The method of claim 1, wherein said desired value for $\Delta P$ is less then maximum operating pressure for the system.

4. The method of claim 1, wherein said desired value determined for $T_s$ is less then the predicted value for $T_s$.

5. The method of claim 1, wherein the flow rate of the fluid ($\dot{V}$) is a function of the ratio of $\dot{Q}$ over $\Delta T$.

6. The method of claim 1, wherein the Reynolds number for the fluid passageways (Re) is a function of the ratio of $\dot{V}$ over $D_1 N_1$.

7. The method of claim 1, wherein the pressure drop for the cooling system ($\Delta P$) is a sum of the pressure drops across the system.

8. The method of claim 1, wherein the surface on the spacecraft to which the heat is to be conductively transferred ($T_{sc}$) is a function of $T_{f,avg}$ plus the ratio of $\dot{Q}$, $D_1$, over $\dot{V}$, $N_1$, $L_1$.

wherein $T_{f,avg}$ is the average temperature of the fluid measured at the entrance and exit of the cooling plate.

9. The method of claim 1, wherein said fluid is a fluorinert.

10. A method for constructing a cooling plate for the thermal testing of spacecraft, that has one or more fluid passageways and is part of a cooling system, comprising the steps of:

determining the number of fluid passageways ($N_1$) and the diameter of the fluid passageways ($D_1$) in said cooling plate by:

determining predicted heat loads for said spacecraft ($\dot{Q}$), determining the cooling plate mounting surface temperature ($T_{sc}$) of the spacecraft where the cooling plate is to conductively transfer heat, determining physical constraints for the attachment of said cooling plate to said spacecraft with respect to the cooling plate's length ($L_1$), selecting a fluid, making an assumption as to the difference in temperature between said fluid entering said cooling plate and said fluid exiting said cooling plate ($\Delta T$), making an assumption as to the number of fluid passageways ($N_1$) in said cooling plate, making an assumption as to the diameter of the fluid passageways ($D_1$) in said cooling plate, determining the flow rate of the fluid ($\dot{V}$), determining the Reynolds number for the fluid passageways (Re), determining the pressure drop for the cooling system ($\Delta P$), determining the surface temperature of the spacecraft to which the heat is to be conductively transferred ($T_s$), and repeating the above steps until the desired values for Re, $\Delta P$, and $T_s$ are achieved, and constructing a cooling plate based on the determined values for $N_1$ and $D_1$ that satisfy said desired values.

11. The method of claim 10, wherein said desired value for Re is greater then 2300.

12. The method of claim 10, wherein said fluid is a fluorinert.

* * * * *